(12) United States Patent
Ellan et al.

(10) Patent No.: US 12,010,177 B2
(45) Date of Patent: Jun. 11, 2024

(54) DEVICE AND METHOD FOR HANDLING CRITICAL EVENTS IN AN IoT ENVIRONMENT

(71) Applicant: Samsung Electronics Co., Ltd., Suwon-si (KR)

(72) Inventors: Ilavarasu Jayabalan Ellan, Bangalore (IN); Sunchit Sharma, Bangalore (IN); Ariyalur Chandrasekaran Ganesh, Bangalore (IN); Kishore Chandra Sahoo, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/855,705

(22) Filed: Jun. 30, 2022

(65) Prior Publication Data

US 2023/0132999 A1 May 4, 2023

Related U.S. Application Data

(63) Continuation of application No. PCT/KR2022/000519, filed on Jan. 12, 2022.

(30) Foreign Application Priority Data

Oct. 29, 2021 (IN) .............................. 202141049481

(51) Int. Cl.
*H04L 67/12* (2022.01)
*G08B 21/02* (2006.01)
(Continued)

(52) U.S. Cl.
CPC .............. *H04L 67/12* (2013.01); *G08B 21/02* (2013.01); *G16Y 20/10* (2020.01); *G16Y 40/10* (2020.01)

(58) Field of Classification Search
CPC ........ H04L 67/12; G08B 21/02; G16Y 20/10; G16Y 40/10
See application file for complete search history.

(56) References Cited

U.S. PATENT DOCUMENTS

| 7,148,791 B2 | 12/2006 | Grisham et al. |
| 10,393,590 B2 | 8/2019 | Fadell et al. |

(Continued)

FOREIGN PATENT DOCUMENTS

| KR | 102210087 B1 | 2/2021 |
| KR | 102212200 B1 | 2/2021 |
| WO | 2021/157918 A1 | 8/2021 |

OTHER PUBLICATIONS

International Search Report dated Jul. 19, 2022 in connection with International Patent Application No. PCT/KR2022/000519, 4 pages.
(Continued)

*Primary Examiner* — Rufus C Point

(57) ABSTRACT

The embodiment, herein disclose a method of handling critical events in IoT environment comprising a plurality of IoT devices and an at least one UWB sensor. The method comprises detecting an occurrence of an event using the UWB sensor; validating the event using at least one IoT device from the plurality of IoT devices located in vicinity of the event; determining a critical level of the event based on at least one of a presence of a user or a device data of the at least one IoT device located in a vicinity of the event; generating an action recommendation for the at least one of the user or the at least one IoT device based on the criticality level of the event.

16 Claims, 12 Drawing Sheets

(51) Int. Cl.
*G16Y 20/10* (2020.01)
*G16Y 40/10* (2020.01)

(56) References Cited

U.S. PATENT DOCUMENTS

| | | | | |
|---|---|---|---|---|
| 2008/0291024 | A1* | 11/2008 | Zhang | G01S 5/0289 |
| | | | | 340/572.1 |
| 2009/0322548 | A1* | 12/2009 | Gottlieb | G08B 21/0446 |
| | | | | 340/686.6 |
| 2012/0173204 | A1* | 7/2012 | Padmanabhan | G01S 15/89 |
| | | | | 703/1 |
| 2015/0097683 | A1 | 4/2015 | Sloo et al. | |
| 2016/0026354 | A1* | 1/2016 | McIntosh | G06Q 10/06 |
| | | | | 706/12 |
| 2016/0300468 | A1* | 10/2016 | Stricker | G08B 21/02 |
| 2017/0278363 | A1* | 9/2017 | Webb | H04W 4/021 |
| 2017/0337805 | A1* | 11/2017 | Eyring | H04L 67/306 |
| 2018/0206099 | A1* | 7/2018 | O'Connor | G01K 1/026 |
| 2019/0041973 | A1 | 2/2019 | Maheshwari et al. | |
| 2019/0317972 | A1* | 10/2019 | Patton | G06F 16/9537 |
| 2019/0325728 | A1 | 10/2019 | Kim et al. | |
| 2020/0053315 | A1* | 2/2020 | Young | H04N 21/42203 |
| 2020/0053325 | A1* | 2/2020 | Deyle | G05D 1/0088 |
| 2020/0064456 | A1 | 2/2020 | Xu et al. | |
| 2020/0175976 | A1 | 6/2020 | Rakshit et al. | |
| 2020/0211364 | A1 | 7/2020 | Kasiviswanathan | |
| 2020/0328933 | A1* | 10/2020 | Wu | H04W 4/38 |
| 2021/0006933 | A1* | 1/2021 | Dean | G16Y 40/10 |
| 2021/0274315 | A1* | 9/2021 | Daoura | H04W 4/38 |
| 2022/0050199 | A1* | 2/2022 | Waldron | G06N 3/02 |
| 2022/0270461 | A1* | 8/2022 | Watts | G06F 18/2431 |

OTHER PUBLICATIONS

Written Opinion of the International Searching Authority dated Jul. 19, 2022 in connection with International Patent Application No. PCT/KR2022/000519, 6 pages.

Examination report issued Apr. 1, 2024, in connection with Indian Patent Application No. 202141049481, 6 pages.

* cited by examiner

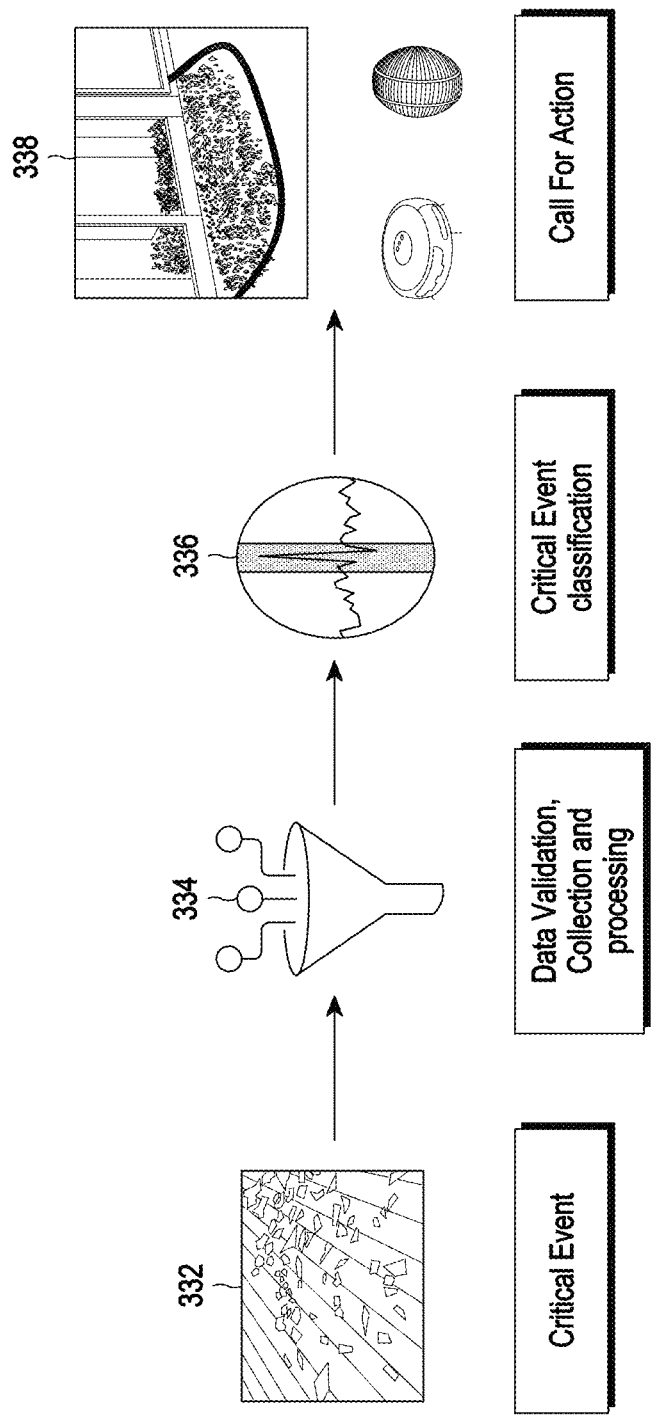

DEVICE AND METHOD FOR HANDLING CRITICAL EVENTS IN AN IoT ENVIRONMENT

CROSS-REFERENCE TO RELATED APPLICATIONS

This application is a continuation of International Application No. PCT/KR2022/000519 filed on Jan. 12, 2022, which claims priority to Indian Patent Application No. 202141049481 filed on Oct. 29, 2021, in the Indian Intellectual Property Office, the disclosures of which are incorporated herein by reference in their entirety.

BACKGROUND

1. Field

The present disclosure relates to ultra wide band (UWB) sensors and more specifically the disclosure relates to a method and an electronic device for handling critical events in an internet of things (IoT) environment using the UWB sensors.

2. Description of Related Art

Detection of health hazards to a user in an IoT environment is very essential. Existing system discloses a "Smarthome hazard detection system" which provides context-based user notifications to a user. In an embodiment, the existing art discloses a hazard detector being triggered by presence of a hazardous substance. In one embodiment, the hazard detector is triggered if the level of hazardous substance present (i.e., the amount or concentration of the hazardous substance) is greater than a threshold setting.

Yet another existing system discloses a "Wireless danger proximity warning system and method". The wireless danger proximity warning system discloses a UWB radio associated with an object for receiving UWB signal and alerting a person about the potentially dangerous situation.

However, warning and/or the notification provided by the existing system may be false warning at times, as only a single device is used for detecting an anomaly/event/dangerous situation.

Further, the existing arts does not recommend an action for other devices in a vicinity of the anomaly/event/dangerous situation, and/or the user to avoid the hazard. The existing systems also do not disclose anything about triggering the other devices in the vicinity of the anomaly/event/dangerous situation to perform the recommended action for avoiding health hazards to the user.

The existing hardware fails to detect anomaly in blind spots (camera) and multiple signal interference (AI speakers). Also, the existing system fails to recognize the hidden objects under opaque obstacles/walls (camera). Further, due to heavy computation it becomes difficult to detect real time distance calculation between user and the critical event. Also, the existing cameras does not detect people/pet movements in other room. Thus, it is desired to address the above mentioned disadvantages or other shortcomings or at least provide a useful alternative.

The principal object of the embodiments herein is to provide a method and an electronic device for handling critical events in an IoT environment using UWB sensors.

Another object of the embodiments herein is to provide a method and the electronic device for detecting an event and validating the detected event using other IoT devices and UWB sensors present in a vicinity of the detected event for preventing false information about the event.

Another object of the embodiment herein is to detect criticality of the event and accordingly provide recommendation based on the detected event for preventing health hazards to a user.

Another object of the embodiment herein is to trigger other IoT devices in the vicinity of the user to perform an action based on the recommendation for preventing health hazards to the user.

SUMMARY

Accordingly, the embodiments herein disclose a method for handling critical events in an internet of things (IoT) environment comprises a plurality of IoT devices and at least one UWB sensor. The method of handling the critical events comprises: detecting, by an electronic device, an occurrence of an event using at least one UWB sensor electronic device present in the IoT environment; validating, by the electronic device, the event using at least one IoT device from the plurality of IoT devices located in vicinity of the electronic device event; determining, by the electronic device, a criticality level of the event based on at least one of a presence of a user or a device data of the at least one IoT device located in the vicinity of the event; and generating electronic device electronic device, by the electronic device a recommendation for at least one of the user or the at least one IoT device based on the criticality level of the event.

In an embodiment, the electronic device is one of the IoT devices in the IoT environment.

In an embodiment, the at least one UWB sensor may be present in any of the IoT device. In another embodiment, the at least UWB sensor may be a standalone senor in the IoT environment.

In an embodiment, the method comprises triggering, by the electronic device, the at least one IoT device to perform the recommended action and/or displaying the recommendation for user action to the user.

In an embodiment, detecting the occurrence of the event in the IoT environment comprises scanning, by the electronic device, the IoT environment using the at least one UWB sensor; obtaining, by the electronic device, measurements of the IoT environment from the at least one UWB sensor, wherein the measurements comprise at least one of a location or a shape of at least one object in the IoT environment; comparing, by electronic device, the obtained measurements of the IoT environment with pre-stored measurements of the IoT environment; and detecting, by the electronic device, the occurrence of the event in response to determining a change in the measurements.

In an embodiment, validating the event comprises obtaining, by electronic device, measurements for the event from at least one IoT device from the plurality of IoT devices; checking, by the at least one electronic device, whether the measurements for the occurrence of the event obtained by the at least one IoT device match with the measurements obtained by the at least one UWB sensor; and validating, by the electronic device, of the event in response to determining that the measurements for the event obtained by the at least one IoT device match with the measurements obtained by the at least one UWB sensor.

In an embodiment, determining the critical level of the validated event comprises determining, by the electronic device, a location of the user and the event occurred; classifying, by electronic device, the event occurred in one of a low critical event category, a medium critical event category and a high critical event category based on the location of the user and the event occurred.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3C illustrates the flow of handling glass breakage event, according to an embodiment as disclosed herein.

DETAILED DESCRIPTION

Figure 1:
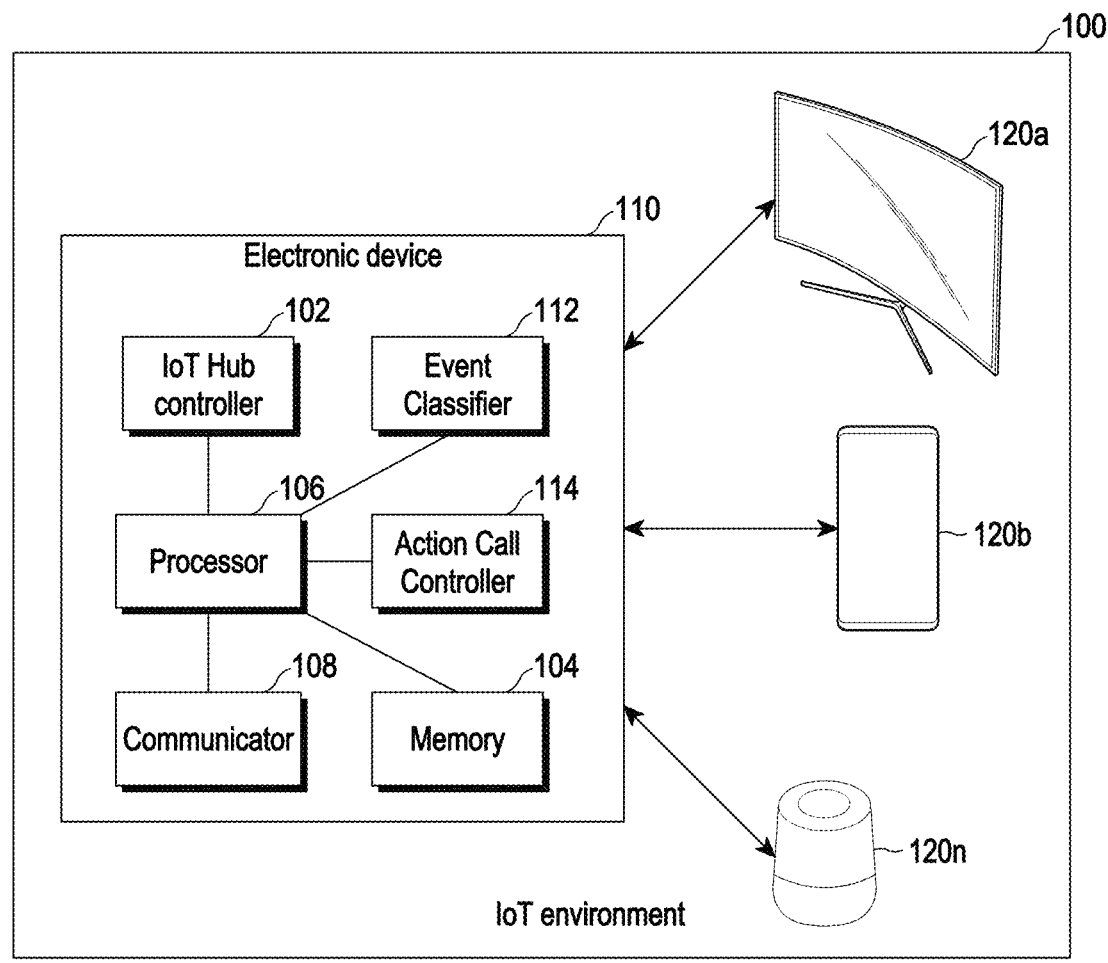
FIG. 1 illustrates an IoT environment comprising an electronic device for handling an event, according to an embodiment as disclosed herein.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analogy and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally used to distinguish one element from another.

Accordingly, the embodiments herein provide a method and an electronic device for handling event in an IoT environment. In an embodiment, the electronic device detects an event in the IoT environment using at least one UWB sensor. Further the detected event is validated using other devices in the IoT environment, which prevent detection of false event. After validation, a criticality of the validated event is determined, wherein the criticality of the event is associated with a hazard to the user caused by the event.

Based on the criticality a recommendation is provided to either the user or the other devices in the IoT environment or both for preventing any health hazard to the user.

The usage of electronic device and IoT devices for detecting and validating event provides accurate event detection without any error.

Referring now to the drawings, and more particularly to FIGS. 1 through 6, where similar reference characters denote corresponding features consistently throughout the figures, there are shown preferred embodiments.

FIG. 1 illustrates an IoT environment 100 comprising an electronic device 110 for handling an event, according to an embodiment as disclosed herein.

As seen in FIG. 1, the electronic device 110 is connected to a plurality of IoT device (120a, 120b, 120c . . . 120n) collectively termed as 120, in the IoT environment 100. The electronic device 110 may comprise UWB sensors and may be, for example, but not limited to, a mobile device, a smart watch, a cellular phone, a smart phone, a personal digital assistant (PDA), a tablet computer, a laptop computer, an internet of things (IoT) device, an artificial intelligent (AI) device or the like. In on embodiment, the electronic device 110 is one of the plurality of IoT devices 120. In another embodiment, the electronic device 110 and the plurality of IoT devices 120 are UWB devices.

Similarly, the plurality of IoT devices 120 may be, for example, but not limited to, a mobile device, a smart watch, a cellular phone, a smart phone, a personal digital assistant (PDA), a tablet computer, a laptop computer, an internet of things (IoT) device, an artificial intelligent (AI) device or the like.

The IoT environment also comprises UWB sensor. The UWB sensors may be present in the plurality of IoT devices 120 or may be standalone sensors.

In an embodiment, the electronic device 110 and the plurality of IoT devices 120 are Edge devices.

In an embodiment, the electronic device 110 includes an IoT hub Controller 102, a memory 104, a processor 106, a communicator 108, an event classifier 112, and an action call controller 114.

In an embodiment, the UWB sensors present in the electronic device 110 or the plurality of plurality of IoT devices 120 detects an event in the IoT environment 100. In another embodiment, the standalone UWB sensors also detects the event.

In an embodiment, the UWB sensors scans the IoT environment 110 using the UWB sensors. Further, the electronic device 110 obtains the measurements of the IoT environment 100 from the UWB sensors. The measurements of the IoT devices comprises a location of the user in the IoT environment 100, a location and a shape of different objects in the IoT environment.

Further, the electronic device 110 compares the obtained measurements of the IoT environment with pre-stored measurements of the IoT environment 100. Further, if the electronic device 110 detects a change in the measurements then the occurrence of the event is detected.

Figure 2:
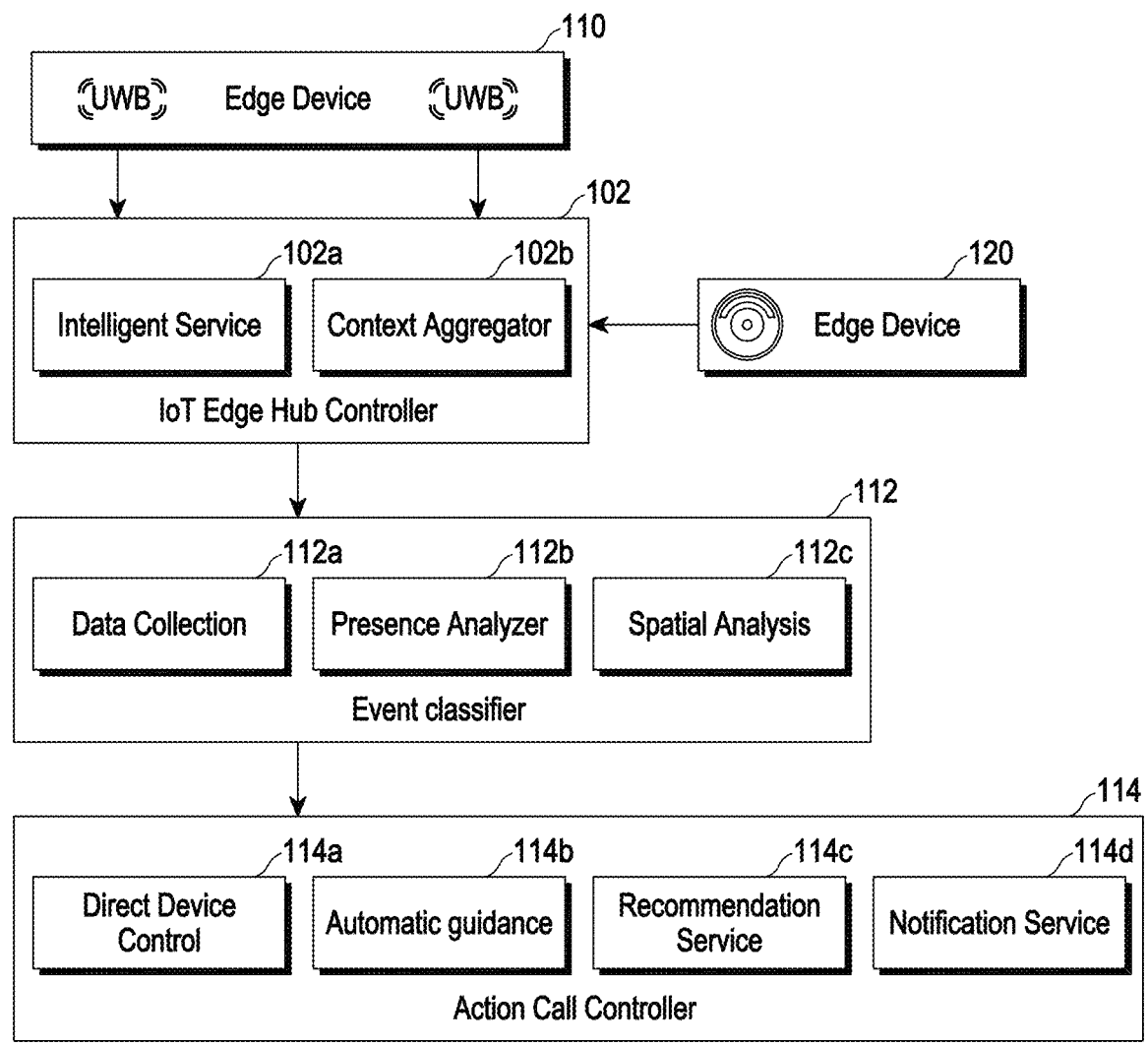
FIG. 2 illustrates a block diagram of an architecture of a UWB system for event handling, according to an embodiment as disclosed herein.

In an embodiment, the detection of the object using the UWB sensors is explained in detailed in FIG. 2.

Once the event is detected, the IoT hub Controller 102 validates the detected event. In an embodiment, the IoT hub Controller 102 seeks information about the detected event from the plurality of IoT devices 120 in the IoT environment 100. The plurality of IoT devices 120 scans the IoT environment 100 after receiving a query about the event from the IoT hub controller 102. After scanning the IoT environment 100, the plurality of IoT devices 120 shares the scanned information with the IoT hub controller 102. The IoT hub controller 102, then validates the detected event based on the information received from the plurality of IoT devices 120. In an embodiment, if the information associated with the event ("event-associated information") detected by the UWB sensors matches with the information obtained from the plurality of IoT devices 120, the event is determined to be valid or else the event detected is invalid.

After validation, the event classifier 112 determines a critical level of the validated event. The critical level of the validated event is based on a location of the user from the event and the adverse effect or the health hazards on the user due to the event. In an embodiment, the event may be classified in a low critical level category or a high critical level category or a medium critical level category, wherein the low critical level category indicates a minimum adverse effect on the user due to the occurrence of the event and the high critical level category indicates a maximum effect due to the occurrence of the event on the user.

Upon determining the critical level of the event, the action call controller 114 of the electronic device 110 determines an action to be performed either by the user or by the device or by both the user and the device such that there is no adverse effect of the event on the user. Further, the action determined for the user is provided as a recommendation to the user and the action determined for the plurality of IoT devices 120 is triggered by the electronic device 110.

The IoT hub controller 102, the action call controller 114 and the event classifier 112 are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

In an embodiment, the memory 104 in the electronic device 110 stores instructions to be executed by the processor 106 for handling critical events.

The memory 104 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 104 may, in some examples, be considered a non-transitory storage medium. The term "non-transitory" may indicate that the storage medium is not embodied in a carrier wave or a propagated signal. However, the term "non-transitory" should not be interpreted that the memory 104 is non-movable. In some examples, the memory 104 can be configured to store larger amounts of information than the memory. In certain examples, a non-transitory storage medium may store data that can, over time, change (e.g., in random access memory (RAM) or cache). The memory 104 can be an internal storage or an external storage unit of the electronic device 110, a cloud storage, or any other type of external storage.

In an embodiment, the processor 106 communicates with the memory 104, the communicator 108, and the IoT hub Controller 102.

The processor 106 is configured to execute instructions stored in the memory 104 for handling critical event.

The processor 106 may include one or a plurality of processors, may be a general purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

In an embodiment, the communicator 108 is configured for communicating internally between internal hardware components and with external devices via one or more networks. The communicator 108 includes an electronic circuit specific to a standard that enables wired or wireless communication.

Although the FIG. 1 shows various hardware components of the electronic device 110 but it is to be understood that other embodiments are not limited thereon. In other embodiments, the electronic device 110 may include a lesser or greater number of components. Further, the labels or names of the components are used only for illustrative purpose and does not limit the scope of the disclosure. One or more components can be combined together to perform same or substantially similar function of handling critical events by the electronic device 110.

FIG. 2 is a block diagram of an architecture of a UWB system for event handling, according to an embodiment as disclosed herein.

As seen in FIG. 2, block 110 refers to a plurality of edge devices 110, wherein the edge devices are the devices present in the IoT environment 100.

In an embodiment, the edge devices reduce the cloud cost, improve user experience through local execution, and improves privacy of sensitive information.

Further, for example following features happens locally without going to cloud: Context service: Collect and process device information for context service [Example historical data: History of weekly use of washing machine]. Action service: Select device that will execute action and send command within connected local devices. [Example: Launch netflix app]. Device service: Retrieve device matching to the condition for service execution. [Example: Real-time list of mobile devices accessed at home].

In case of any Breakage sound that comes, check and validate with nearby devices if the sound came from Smart TV or has happened in real at home by triggering UWB/Camera to see if displacement of Glass articles inside the room.

Block 102 refers to the IoT hub controller comprising an intelligent service block 102a and a context aggregator 102b. The service block 102a is an AI service component which uses data of block 102b.

Block 102b collects context service data and monitors (observe) method or on-demand (GET) method for nearby devices. In an embodiment 102b collects a device profile, a device status and application data. The device profile comprises feature equipment specification, equipment version information, regular information such as whether to display information or not, whether sound AI service is available or not, speaker, Bluetooth connection, etc.

The device status comprises information such as equipment current Status, work details, setting and operational information.

The application data comprises application's internal information operating from equipment such as music playing, sound utterance, etc.

Block 112 refers to an event classifier for classifying the events in different levels of criticality. The event classifier 112 comprises a data collection block 112a, a presence analyser block 112b and a spatial analysis block 112c.

In an embodiment, the data collection block 112a is responsible for collecting information about the event such as occurrence of the event, a location of the event, an object or a human associated with the event and the like. The presence analyser block 112b analyzes the presence of the human surrounding of the event. The spatial analysis block 112c obtains detailed information about the event such as predicting the damage due to the occurrence of the event, methods/preventive measures for avoiding hazards due to occurrence of the event and the like.

Block 114 refers to call action block, which determines the action to be performed after the event is occurred and providing recommendation/triggering devices for performing the determined action. The call action block 114 comprises a direct device control block 114a, an automatic guidance block 114b, a recommendation service block 114c and a notification service block 114c. The direct device control block 114a triggers IoT devices 120 in the IoT environment 100 for preventive health hazards or any other damage due to occurrence of the event. In an embodiment, the automatic guidance block 114b, helps the user to avoid health hazards and/or any damaged due of occurrence of the event by guiding the user.

The recommendation service block 114c provides recommendation to the user for avoiding health hazards or other damages due to the event. The notification service block 114d sends notification to the user about the event.

Although the FIG. 2 shows various hardware components of the electronic device 110 for handling, it is to be understood that other embodiments are not limited thereon. In other embodiments, the electronic device 110 may include a lesser or greater number of components. Further, the labels or names of the components are used only for illustrative purpose and does not limit the scope of the disclosure. One or more components can be combined together to perform same or substantially similar function of handling critical events by the electronic device 110.

Figure 3A:
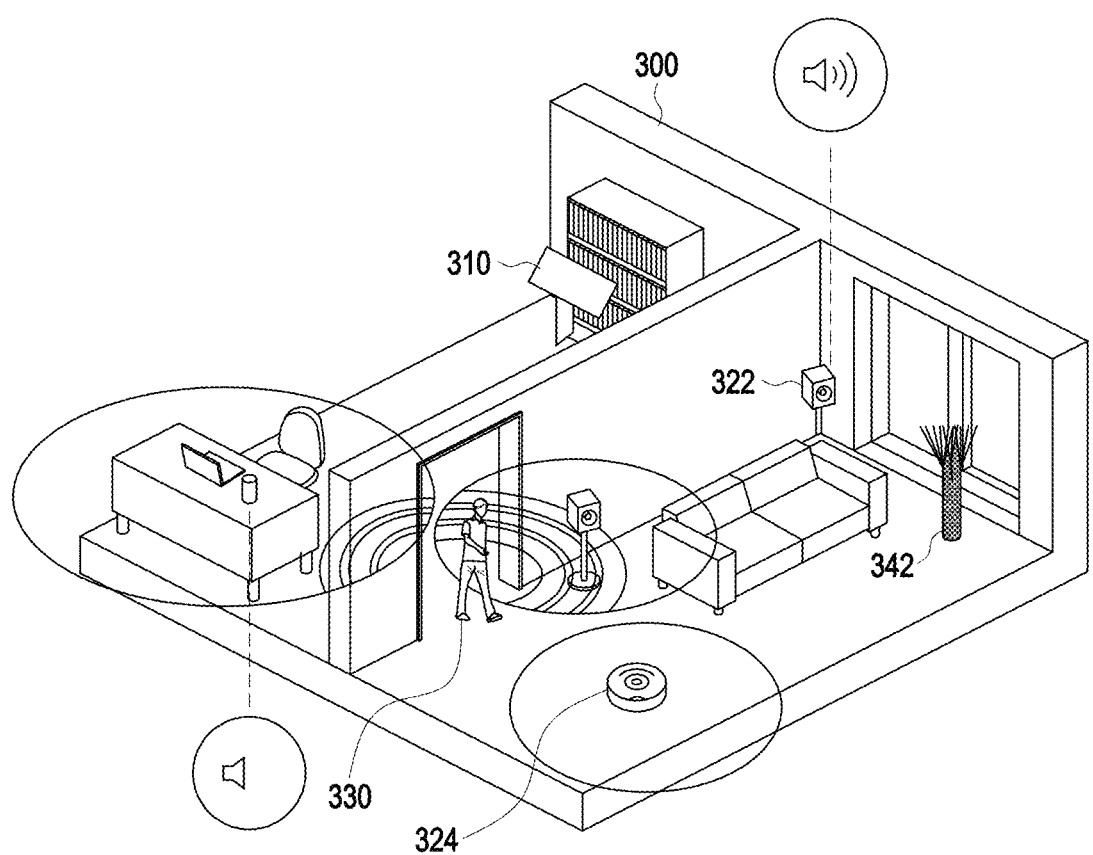
FIG. 3A illustrates an IoT home environment wherein the electronic device handles the critical event, according to an embodiment as disclosed herein.

FIG. 3A illustrates an IoT home environment wherein the electronic device handles the critical event, according to an embodiment as disclosed herein.

As seen in FIG. 3A, the IoT home 300, comprises an electronic device 310, wherein the electronic device 310 is a television. Further, the IoT home 300 also comprises plurality of IoT devices such as an AI speaker 322 and a robot cleaner 324. The user 330 is present in the IoT home 300. The IoT home 300 comprises a glass flower vase 342. In an embodiment, the IoT home 300 may comprise multiple objects other than the glass flower vase 342.

In an embodiment, the IoT home 300 is already scanned by UWB sensors in the electronic device 310, and the scanned images/measurements are stored in the memory 104. The electronic device 310 keeps scanning the IoT home 300 at regular intervals for detection of an event. Detection of the event, handling of the event and providing recommendation for avoiding health hazards are explained in two different stages by table 1 and table 2.

As seen in table 1, at step 1, edge devices comprising UWB sensors detects a direction in response to sensing abrupt changes from the already stored measurements.

At step 2, the electronic device 310 analyzes the object positioning using the UWB sensors and inform an edge platform about any event detected. In the present embodiment, the UWB sensors detect an event corresponding to an abrupt change in position and dimension of the glass flower vase 342. At step 3, the electronic device 310 activates the IoT device (robot cleaner) 324 for obtaining additional information about the detected event. Upon activation, the robot cleaner 324 identifies a fallen object (the glass flower vase on the ground and determines whether the detected event by the UWB sensors was false or true. In an embodiment, if the robot cleaner 324 determines that the detected event is true, the electronic device 310 validates the detected event. After validation of the detected event, the electronic device 310 enables presence detection services and enables the corresponding presence detection sensors. In an embodiment, the presence sensor detects whether a human or a pet is present in the IoT home 300.

If the presence sensor detects that either the human or the pet is present in the IoT home 300, then information about a depth of damage due to the event is obtained and further a distance between the user and the fallen object is determined.

Further, the electronic device 310 determines a criticality score of the event based on the information about the depth of damage due to the event and the distance between the fallen object and the detected human and/or pet. Further, the action to be performed either by the user and/or by the IoT devices 322 and 324 is determined.

Table 2 below determines the recommendation part based on the criticality score.

As seen in Table 2, based on the criticality level of the event and the health hazards to the user/pet due to the event, the electronic device 310 triggers the determined action such as notifying the user about the fallen object, triggering the robot cleaner 324 for cleaning the fallen glass flower vase and the like. In another embodiment, if water is spilled on ground due to the glass flower vase 342, then the electronic device 310 notifies the user by outputting a message saying "please walk slowly, the floor is wet," and activates a floor heater. In another embodiment, if the glass is shattered, then the electronic device 310 recommends the user not to move until the floor is cleaned and activates the robot cleaner 324 for cleaning the floor.

TABLE 1

| STAGE 1 | Edge Hub | Edge Devices |
|---|---|---|
| STEP 1 | Intelligent Service | [UWB Sensor] Detection of stationary object with abrupt changes. |
| STEP 2 | Intelligent Service | [UWB Sensor] Analyze the object positioning, inform edge platform about this event. |
| STEP 3 | Activates additional sensors to verify the event. | [Robot cleaner] Identify and classify fallen object, as false alarm or not. TRUE: GOTO STEP 4 |
| STEP 4 | Enables presence detection services and enables the corresponding sensors. Presence sensor detects (Human/Pet or NO Human) | |
| | | [UWB Sensor/AI Speaker] Presence detection (Human/Pet or NO Human) |
| | {Presence == YES} GOTO STEP 5 {Presence == NO} GOTO STEP 6 | |
| STEP 5 | Spatial Information | [UWB_Sensor] [1] Depth of damage information are collected. [2] Distance between the object fallen and human [Robot cleaner] Nature of the breakage, object detection (for example, glass, ceramic or water spill) |
| STEP 6 | [AI Service] Predict the criticality score base on the mined data | |
| STEP 7 | Call for Action | Move to STAGE 2 |

TABLE 2

| Presence | Distance | Type | Context classification | Recommendation to user | Action on Edge Device |
|---|---|---|---|---|---|
| Yes | >3 meters | sharp | Critical | Recommend user for safety measure (for example, Wear footwear to avoid injury) | Edge Platform activate and direct robot cleaner to clean the location |
| Yes | <3 meters | sharp | Critical | Recommend user not to move until cleaning is done. | Wait for user actions to trigger any other device triggering like robot-cleaner |
| Yes | <3 meters | water | Medium | Floor is slippery walk slowly | Activate floor heater to dry the place soon |

TABLE 2-continued

| Presence | Distance | Type | Context classification | Recommendation to user | Action on Edge Device |
|---|---|---|---|---|---|
| No | | sharp | Low | Notify user | Edge Platform activate and direct robot cleaner to clean the location |

Figure 3B:
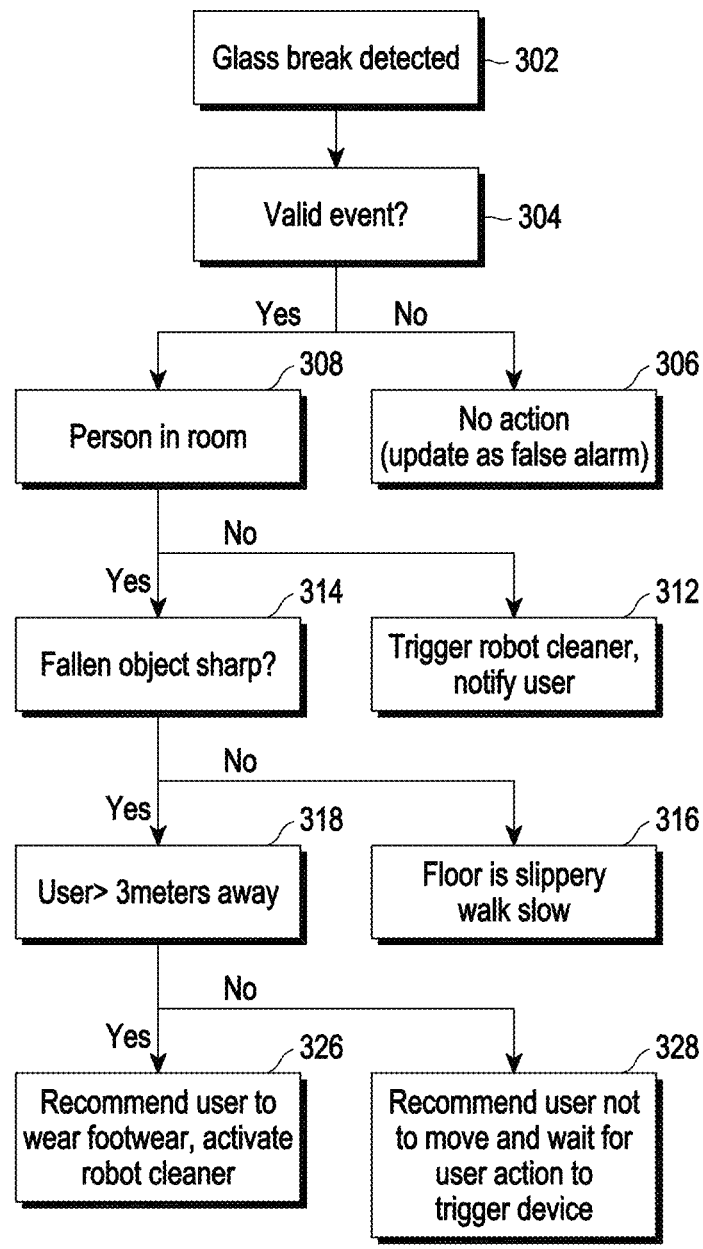
FIG. 3B illustrates the method of handling a flower vase breaking event, according to an embodiment as disclosed herein.

FIG. 3B illustrates the method of handling the cylindrical glass breaking event, according to an embodiment as disclosed herein.

At 302, the cylindrical glass breaking event is detected. At 304, detected event is validated using IoT devices present in the IoT home 300. In an embodiment, the event is not validated then the flow proceeds to 306 or else to 308. At 306, no action is recommended by the electronic device 310 and the detected event is updated as a false event. At 308, the presence of either the human or the pet or both is detected in the IoT home 300. The flow proceeds to 314 in response to determining that the presence of either the human or the pet or else to 312. At 312, the electronic device 310 notifies the user about the event and triggers/activates the robot cleaner 324 for cleaning the floor. At 314, the electronic device 310 determines whether the fallen object (glass flower vase) is sharp. The flow proceeds to 316 in response to determining that the fallen object is not sharp or else to 318.

At 316, the electronic device 310 informs the user that the floor is slippery and walk slowly and also activates the floor heater to dry the floor quickly.

At 318, the electronic device 310 determines the distance of the user from the fallen object. In an embodiment, the electronic device 310 checks that the distance is less than 3 meters. At 326, the electronic device 310 recommends the user to wear footwear and activates the robot cleaner 324 (for example, robot vacuum) for cleaning the floor. In another embodiment, at 328, electronic device 310 recommends the user to not move until cleaning is done and waits for the user to trigger the robot cleaner 324.

Thus, as seen in the present example, the proposed method and device not only provided the recommendation, but also triggers action to be performed by another device in order to prevent health hazard and/or handle the critical event.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

FIG. 3C illustrates the flow of handling glass event breakage, according to an embodiment as disclosed herein.

At 332, the event of glass breaking is detected. At 334, data validation is performed, and the event is validated. At 336, the event is classified based on the critical level of the event. At 338, the action is determined and recommended to the user.

Figure 4A:
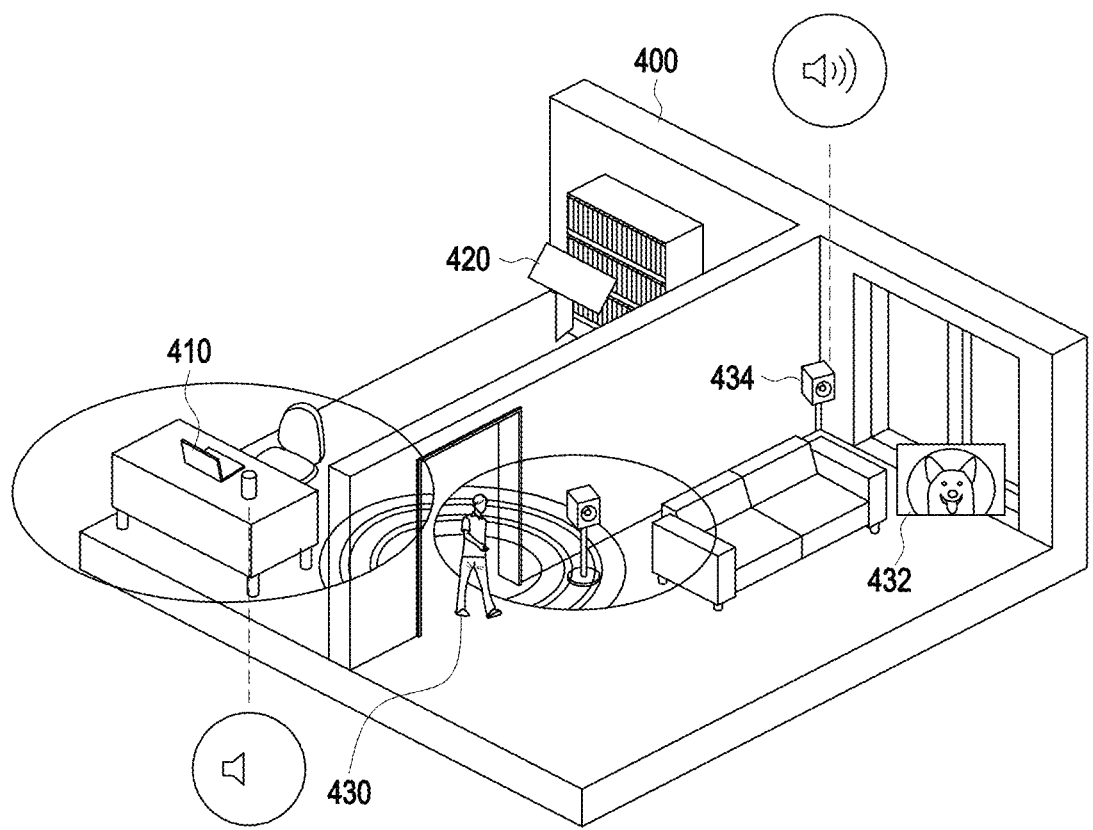
FIGS. 4A, 4B, and 4C illustrate an IoT home environment wherein the electronic device handles the critical event associated with a pet, according to an embodiment as disclosed herein.

FIG. 4A illustrates an IoT home environment wherein the electronic device handles the critical event associated with a pet, according to an embodiment as disclosed herein.

As seen in FIG. 4A, the IoT home 400, comprises an electronic device 410, wherein the electronic device 410 is a laptop. Further, the IoT home 400 also comprises plurality of IoT devices 420. The user 430 and a pet 432 are also present in the IoT home 400. In an embodiment, the IoT home 400 may comprise multiple stationary objects.

In an embodiment, the IoT home 400 is already scanned by UWB sensors in the electronic device 410, and the scanned images/measurements are stored in the memory 104. The electronic device 410 keeps scanning the IoT home 400 at regular intervals for detection of the event. Detection of the event, handling of the event and providing recommendation for avoiding health hazards are explained in two different stages by table 3 and table 4.

As seen in table 3, at step 1, edge devices comprising UWB sensors detects an event in response to pet movement and change in location of the objects in the IoT home 400.

At step 2, the electronic device 410 analyze the human positioning using the UWB sensors and inform an edge platform about the detected event.

At step 3, the electronic device 410 activates a smart tag 422 (not shown) for confirming a precise location of the pet 432, an AI speaker 434 for identifying the pet sounds of distress and for checking if the pet sounds are from a non-natural or external source by matching the location of the pet sounds to the location of the smart tag 422. In certain embodiments, matching the location of the pet sounds to the location of the smart tag 422 includes determining the location of the pet sounds relative to or as a distance from the location of the smart tag 422. In an embodiment, if the pet sound of distress is identified from the pet 432.

After validation of the detected event, the electronic device 410 enables presence detection services and enables the corresponding presence detection sensors. In an embodiment, the presence sensor detects whether a human is present in the IoT home 400.

If the presence sensor detects the human is present in the IoT home 400, then electronic device 410 checks if the pet 432 is moving abnormally or is showing sign of physical distress at step 5.

Further, at step 6, the electronic device 410 determines if the identified human near pet is a family member or a possible intruder. At step 7, the critical score is calculated, and an action is determined for the event at step 8.

Table 4 below determines the recommendation part based on the criticality score.

As seen in table 4, based on the criticality level of the event and the health hazards to the pet, the electronic device 410 triggers the determined action such as activating voice commands and ask user to call pet ambulance. In another embodiment, the electronic device 410 sends emergency notification to all family members and rings an emergency alarm on the AI speaker. In yet another embodiment, the electronic device 410 turns on a camera and send images of the pet 432 to the user.

TABLE 3

| STAGE 1 | Edge Hub | Edge Devices |
|---|---|---|
| STEP 1 | Intelligent Service | [UWB Sensor, Smart Tag] Detect pet movement and object locations in vicinity |

TABLE 3-continued

| STAGE 1 | Edge Hub | Edge Devices |
|---|---|---|
| STEP 2 | Intelligent Service | [UWB Sensor] Analyze the people positioning, inform edge platform about this event. |
| STEP 3 | Activates additional sensors to verify the event. | [Smart Tag] Checks the precise location of the pet using Smart tag [AI Speaker] Identifies pet sounds of distress and checks if the pet sounds are from a non-natural or external source by matching the location of the pet sounds to a location of the smart tag. TRUE: GOTO STEP 4 |
| STEP 4 | Enables presence detection services and enables the corresponding sensors. Presence sensor detects (Human/or NO Human) | |
| | | [UWB Sensor/AI Speaker] Presence detection (Human or NO Human) |
| | {Presence == NO} GOTO STEP 5 {Presence == YES} GOTO STEP 6 | |
| STEP 5 | Spatial Information | [UWB_Sensor] [1] Check if moving abnormally or shows sign of physical distress |
| STEP 6 | Intruder Identification | [UWB_Sensor/Home Cameras] Identify if person near pet is a family member or a possible intruder. |
| STEP 7 | [AI Service] Predict the criticality score base on the mined data | |
| STEP 8 | Call for Action | Move to STAGE 2 |

TABLE 4

| Presence | Pet Distress | Context classification | Recommendation to user | Action on Edge Device |
|---|---|---|---|---|
| Yes, Family | Yes | Medium | Activate voice commands and ask user to call pet ambulance | AI Speaker asks user: Should I call emergency number 911 |
| Yes, Intruder | Yes/No | Critical | Sends emergency notification to All Family members. | Rings alarm sound on speaker |
| Yes, Family | No | Low | Do Nothing | Do Nothing |
| No | Yes | Critical | Sends emergency notification to All Family members. | Turn on Home Camera/ Robot Cleaner cameras on to send footage to user |
| No | No | Low | Do Nothing | Do Nothing |

Figure 4B:
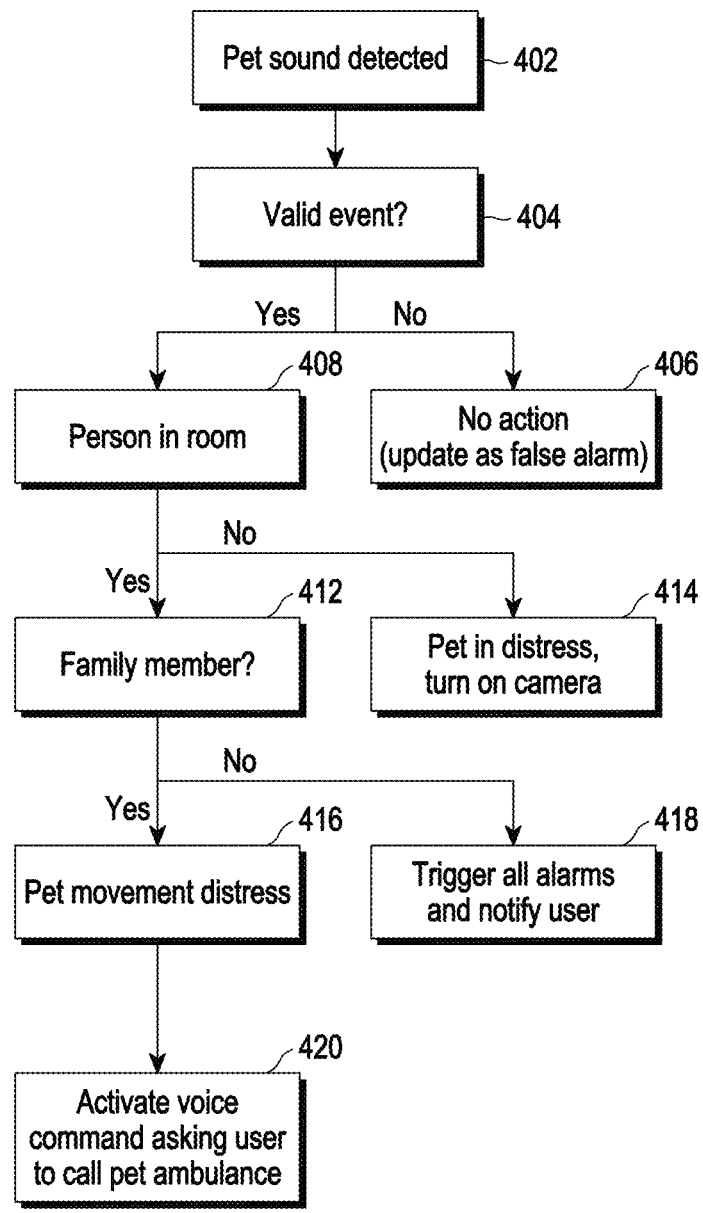

FIG. 4B illustrates the method of handling the pet care event, according to an embodiment as disclosed herein.

At 402, the pet sound detected. At 408, the electronic device 410 detects the human in the IoT home 400 upon validation of the event. At 406, the electronic device 410 updates the detected event as a false alarm in response to determining that the event is not valid. The flow proceeds to 408 in response to determining that the event is valid. At 408, the electronic device 410 determines whether presence of the human is detected. The flow proceeds to 412 in response to detecting human presence or else to 414. At 412, the electronic device 410 determines whether the human detected is a family member. The flow proceeds to 416 in response to determining that the human detected is a family member or else to 418. Further, at 418, the electronic device 410, triggers all alarms in the IoT home environment 400 and notifies the family member with alarms on their mobile device. Whereas at 416, the electronic device 410 determines that the pet 432 is in distress and activate voice commands and ask user to call pet ambulance at 420. In other embodiment at 414, the electronic device 410 turns on a camera and send images of the pet 432 to the user.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 4C:
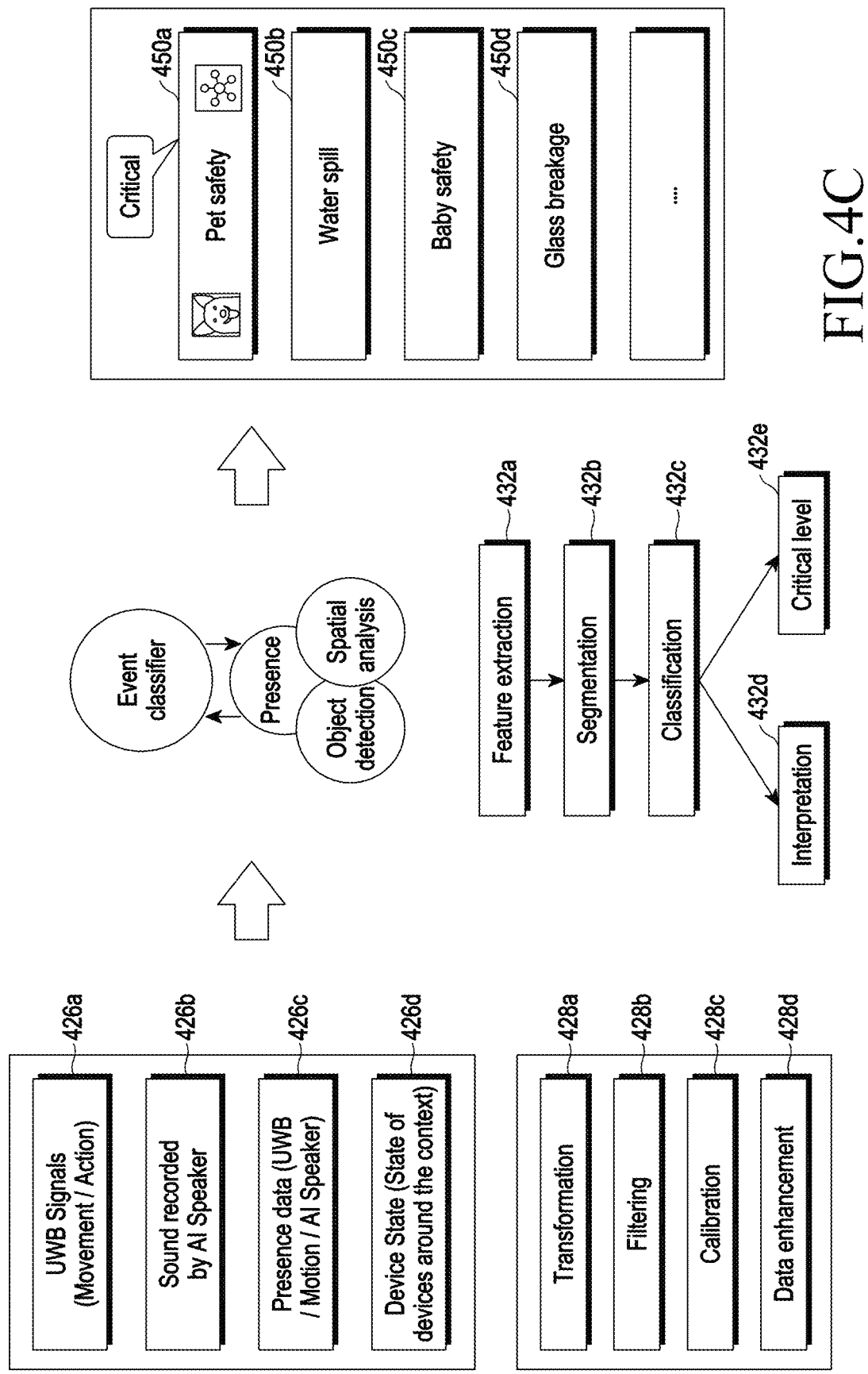

FIG. 4C illustrates the flow of classifying the pet in distress event, according to an embodiment as disclosed herein.

As seen in FIG. 4C, the blocks 426a-426d collect information about the event from the Plurality of IoT devices in the IoT surrounding 400. Further blocks 428a-428d perform transformation, filtering, calibration, and data enhancement. Further blocks 432a-432e assist in feature extraction, segmentation, classification, interpretation, and determining the critical level of the event. For example, an event may be classified or interpreted as pet safety 450a, water spill 450b, baby safety 450c, glass breakage 450d, etc.

Figure 5A:
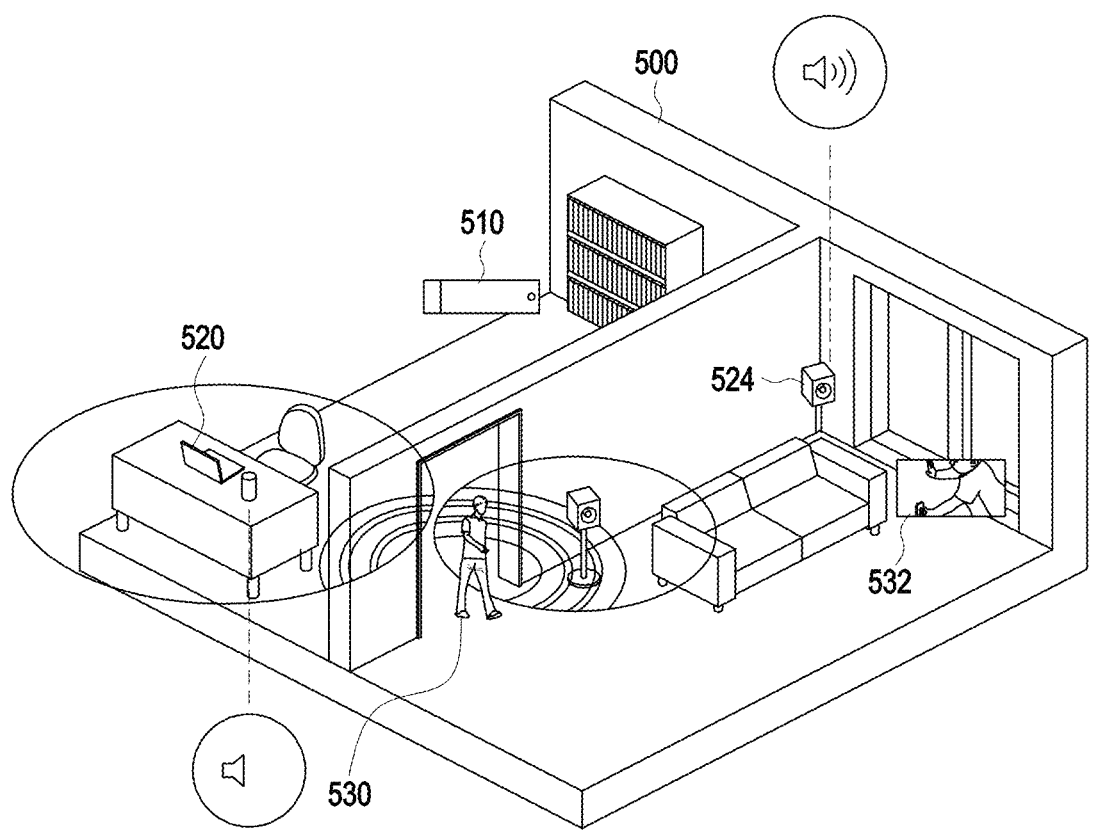
FIG. 5A illustrates an IoT home environment wherein the electronic device handles the critical event associated with a baby movement, according to an embodiment as disclosed herein.

FIG. 5A illustrates an IoT home environment wherein the electronic device handles the critical event associated with a pet, according to an embodiment as disclosed herein.

As seen in FIG. 5A, the IoT home 500, comprises the electronic device 510, wherein the electronic device 510 is a mobile. In an embodiment, the IoT home 500 may include multiple electronic devices.

Further, the IoT home 500 also comprises plurality of IoT devices 520. A human baby 532 and a human adult 530 is also present in the IoT home 500. In an embodiment, the IoT home 500 may comprise multiple stationary objects.

In an embodiment, the IoT home 500 is already scanned by UWB sensors in the electronic device 510, and the scanned images/measurements are stored in the memory 104. The electronic device 510 keeps scanning the IoT home 500 at regular intervals for detection of the event. Detection of the event, handling of the event and providing recommendation for avoiding health hazards for a baby are explained in two different stages by table 5 and table 6.

As seen in table 5, at step 1, edge devices comprising UWB sensors detects an event in response to detection of baby movement near unsafe objects in the IoT home 500, wherein the unsafe object is for example, a live electric socket.

At step 2, the electronic device 510 analyzes the position of the baby and the unsafe object informs an edge platform about the detected event.

At step 3, the electronic device 510 activates other IoT devices in the IoT home 500 for validation of the event of the baby movement near unsafe objects.

After validation of the detected event, the electronic device 510 enables presence detection services and enables the corresponding presence detection sensors at step 4. In an embodiment, the presence sensor detects whether a human is present in the IoT home 500.

If the presence sensor detects the human is present in the IoT home 500, then information about a depth of possible hazard to the baby is obtained and further a distance between the baby and the unsafe object is determined at step 5. Further, a status of the live electric socket is measured.

Further, at step 6, the electronic device 510 determines a criticality score of the event based on the information about the depth of hazard due to the event and the distance between the live electric socket and baby. Further, the action to be performed either by the user and/or by the IoT devices is determined at step 7.

Table 6 below determines the recommendation part based on the criticality score.

As seen in table 6, based on the criticality level of the event and the health hazards to the baby, the electronic device 510 triggers the determined action such as activating voice commands seek user's attention towards socket/cradle and activating a smart switch to turn off the power.

In another embodiment, the electronic device 510 sends emergency notification to all family members and rings an emergency alarm on the AI speaker. In yet another embodiment, the electronic device 510 notifies the user with an alert signal.

TABLE 5-continued

| STAGE 1 | Edge Hub | Edge Devices |
|---|---|---|
| STEP 2 | Intelligent Service | [UWB Sensor] Analyze the object positioning, inform edge platform about this event. |
| STEP 3 | Activates additional sensors to verify the event. | [Hub] Identifies the event, classifies the event as false alarm or not. TRUE: GOTO STEP 4 |
| STEP 4 | Enables presence detection services and enables the corresponding sensors. Presence sensor detects (Human or NO Human) | |
| | | [UWB Sensor/AI Speaker] Presence detection (Human or NO Human) |
| | {Presence == NO} GOTO STEP 5 {Presence == YES} GOTO STEP 6 | |
| STEP 5 | Spatial Information | [UWB_Sensor] [1] Depth of possible damage information are collected. [2] Position of baby identified. [Hub] [1] Status of live electric socket measured. |
| STEP 6 | [AI Service] Predict the criticality score base on the mined data | |
| STEP 7 | Call for Action | Move to STAGE 2 |

TABLE 6

| Presence | Position | Context classification | Recommendation to user | Action on Device |
|---|---|---|---|---|
| Yes | Near Socket/Climbing | critical | Activate voice command to seek user's attention towards socket/cradle. | Edge Platform activate and direct AI Speaker to play lullaby. Activate smart Switch to turn off the power. |
| Yes | Moving to Socket/Standing | Medium | Notifies user with an alert signal. | Edge Platform activate and direct smart Switch to turn off the power. |
| No | Near socket/Climbing | Critical | Activate voice command and alarms to seek user's attention towards baby. | Edge Platform activate and direct AI Speaker to play lullaby. |
| No | Standing | Medium | Notifies user with alert signal. | Edge Platform activate and direct smart switch to turn off power. |
| Yes/No | Far from socket/Crawling/Sitting | Low | Do Nothing | Do Nothing |

TABLE 5

| STAGE 1 | Edge Hub | Edge Devices |
|---|---|---|
| STEP 1 | Intelligent Service | [UWB Sensor] Detection of baby movement and other unsafe objects in the vicinity. |

Figure 5B:
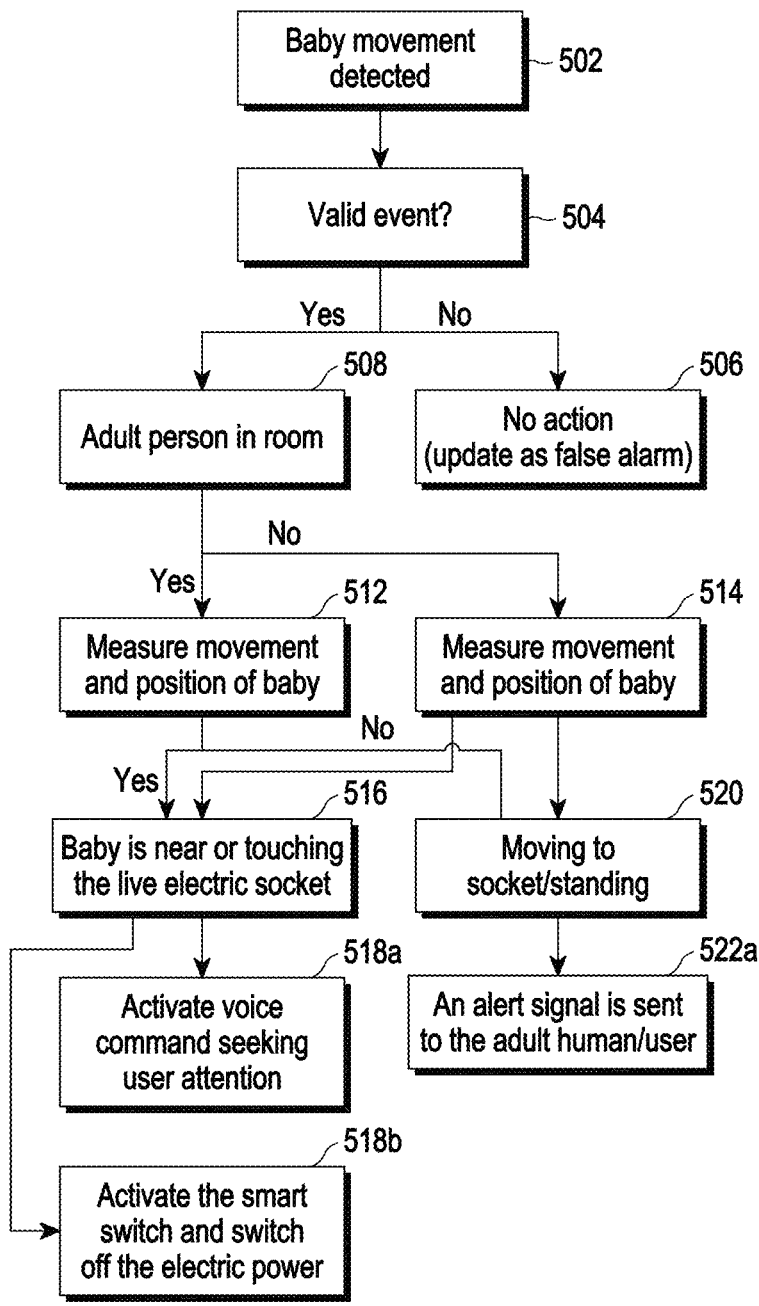
FIG. 5B illustrates the method of handling the baby touching live socket event, according to an embodiment as disclosed herein.

FIG. 5B illustrates the method of handling the baby care event, according to an embodiment as disclosed herein.

At 502, the baby movement near the live electric socket is detected as an event and the event is validated using other IoT devices present in the vicinity of the live electric socket and the baby. In an embodiment, if the event is validated at 504, then the flow proceeds to 508 or else to 506.

At 506, in response to determining that the event is not valid event, the electronic device 510 updates the event as a false event and no action is performed. Further, the electronic device 510 keeps scanning for baby movement near unsafe objects.

At 508, in response to determining the event is valid, the electronic device 510 determines whether an adult human is present in the IoT home 500. In an embodiment, if the adult human is present in the IoT home 500, then the flow proceeds to 512 or else to 514. At 512 and at 514, the electronic device 510 measures the position and movement of the baby. If the electronic device 510 determines that baby human is near or touching the live electric socket at 516, then the electronic device 510 determines the event as unsafe for the baby and activates voice commands to seek the adult human attention at 518a. In another embodiment, the electronic device 510 may activate the smart switch and switch off the electric power at 518b.

Further, at 520, if the electronic device 510 determines that the baby is moving towards the live electric socket, then an alert signal is sent to the adult human/user at 522a.

In another embodiment, at 514, the electronic device 510 measures the position and movement of the baby. If the electronic device 510 determines that baby human is near or touching the live electric socket at 516, then the electronic device 510 determines the event as unsafe for the baby and activates voice commands to seek the adult human attention at 518a. In another embodiment, the electronic device 510 may activate the smart switch and switch off the electric power at 518b. Further, at 520, if the electronic device 510 determines that the baby is moving towards the live electric socket, then an alert signal is sent to the adult human/user at 522a.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 5C:
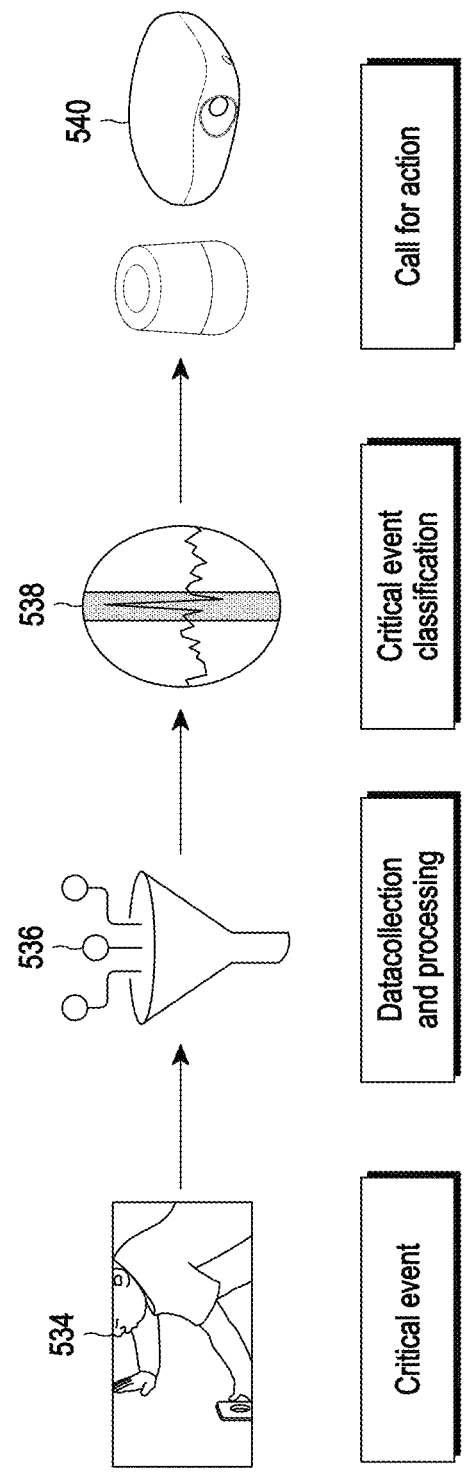
FIG. 5C illustrates the flow of handling baby movement, according to an embodiment as disclosed herein.

FIG. 5C illustrates the flow of handling baby care event, according to an embodiment as disclosed herein.

At 534, the event of baby movement is detected. At 536, data validation is performed, and the event is validated. At 538, the event is classified based on the critical level of the event. At 540, the action is determined and recommended to the user.

Figure 6:
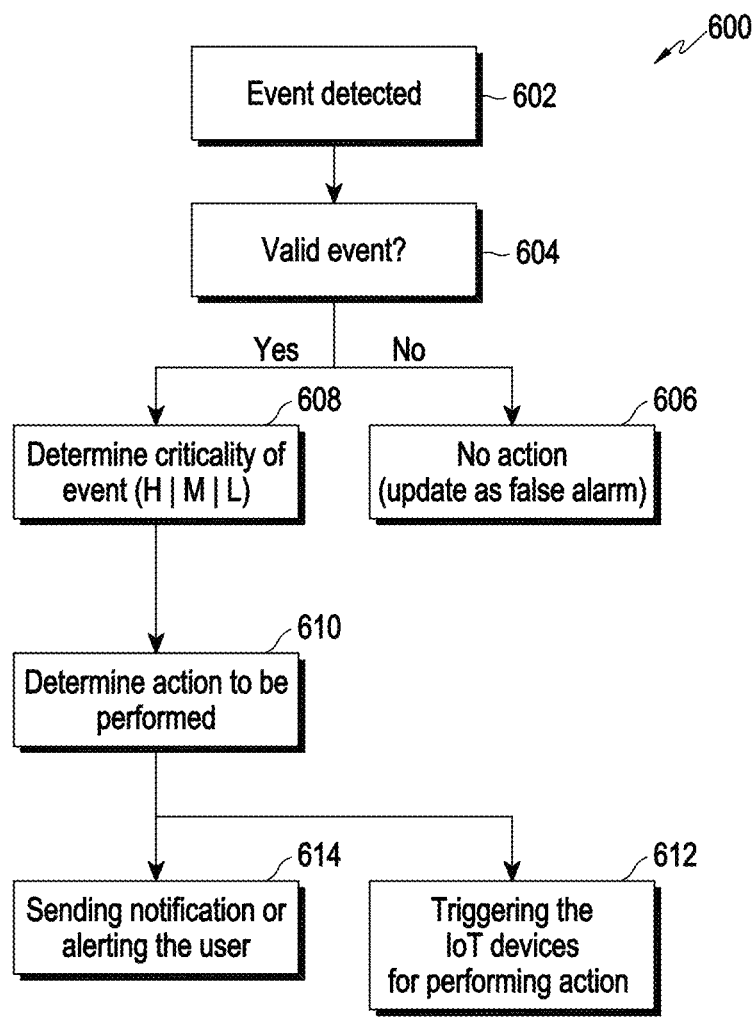
FIG. 6 illustrates a method for handling events according to an embodiment as disclosed herein.

FIG. 6 illustrates a method 600 for handling events according to an embodiment as disclosed herein.

At 602, the flow 600 discloses detecting, by the electronic device 110, the occurrence of the event using at least one UWB sensor of the at least one UWB sensor in electronic device 110 present in the IoT environment 100.

At 604, the method comprises determining whether the detected event is a valid event or not. For determining the validity of the detected event, the electronic device 110 activates other IoT devices 120 for sensing/scanning the IoT environment 100 and validating the detected event. The flow 600 proceeds to 606 in response to determining that the detected event is not valid. At 606, the electronic device 110 updates the detected event as a false event and does not perform any action.

In another embodiment the flow 600 proceeds to 608 in response to determining that the detected event is valid. At 608, the electronic device 110 determines a critical level of the event. The critical level of the event is determined based on the health hazard to the user due to the event or any other damages in the IoT environment 100 due to the occurrence of the event.

After determining the critical level, the flow 600 proceeds to 610, where the electronic device 110 determines the action to be performed in order to avoid any health hazards or any damages caused due to the occurrence of the event. After determining the action to be performed, the flow proceeds to 614 and 612.

At 614, the method comprises sending notification or alerting the user or recommending the determined action to the user by the electronic device 110. In another embodiment at 612, the method comprises triggering the IoT devices 120 for performing the determined action by the electronic device 110.

Thus, as seen in the above, the proposed method and the electronic device 110 in the IoT environment 100 accurately detects any event and provides recommendations for avoiding adverse effects due to the event. Further, the proposed method and the electronic device 110 also triggers the IoT devices 120 for performing the determined action in order to prevent any hazards due to the occurrence of the event.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for handling critical events in an internet of things (IoT) environment, wherein an IoT environment includes a plurality of IoT devices and at least one ultra wide band (UWB) sensor, the method comprising:
   detecting, by an electronic device, using the at least one UWB sensor present in the IoT environment, an occurrence of an event;
   validating, by the electronic device, using at least one IoT device among the plurality of IoT devices located in a vicinity of the event, the occurrence of the event;
   determining, by the electronic device, a criticality level of the event based on at least one of a presence of a user in the IoT environment or a device data of the at least one IoT device located in the vicinity of the event, wherein determining the critical level of the event comprises:
   determining, by the electronic device, a location of the user when the event occurred; and
   classifying, by electronic device, the event as one of a low critical event, a medium critical event, or a high critical event based on whether the location of the user when the event occurred satisfies a proximity condition; and
   generating, by the electronic device, a recommendation that recommends an action for at least one of the user or the at least one IoT device of the plurality of IoT devices, based on the criticality level of the event,
   wherein the proximity condition is satisfied when the location of the user when the event occurred is within a predefined range of distance from the event,
   wherein the classifying of the event further includes classifying the event as the high critical event based on a determination that the proximity condition is not satisfied.

2. The method as claimed in claim 1, wherein the method further comprises:
   triggering, by the electronic device, the at least one IoT device to perform the recommended action.

3. The method as claimed in claim 1, wherein the recommendation that recommends the action for the user recommends an action that avoids health hazards to the at least one of the user due to the occurrence of the event.

4. The method as claimed in claim 1, wherein the device data of the at least one IoT device comprises a location of the at least one IoT device relative to a location of the event and a type of the at least one IoT device.

5. The method as claimed in claim 1, wherein detecting the occurrence of the event comprises:
   scanning, by the electronic device, using the at least one UWB sensor, the IoT environment;
   obtaining, by the electronic device, measurements of the IoT environment from the at least one UWB sensor, wherein the measurements comprise at least one of a location or a shape of at least one object in the IoT environment;
   comparing, by electronic device, the obtained measurements of the IoT environment with pre-stored measurements of the IoT environment;
   determining, by the electronic device, a change in the measurements based on the comparison; and
   detecting, by the electronic device, the occurrence of the event in response to determining the change in the measurements.

6. The method as claimed in claim 5, wherein validating the occurrence of the event comprises:
   obtaining, by electronic device, measurements for the occurrence of the event from at least one IoT device among the plurality of IoT devices;
   determining, by the electronic device, whether the measurements for the occurrence of the event obtained from the at least one IoT device match with the measurements of the IoT environment obtained from the at least one UWB sensor; and
   validating, by the electronic device, the occurrence of the event in response to determining that the measurements for the event obtained from the at least one IoT device match with the measurements of the IoT environment obtained from at least one UWB sensor.

7. The method as claimed in claim 1, wherein determining the criticality level of the event comprises:
   determining, by the electronic device, an event type corresponding to potential adverse effect or health hazards on the user due to the occurrence of the event; and
   classifying the event as the low critical event based on a determination the event type corresponds to potential low adverse effect or health hazards on the user due to the occurrence of the event; or
   classifying the event as the high critical event based on a determination the event type corresponds to potential high adverse effect or health hazards on the user due to the occurrence of the event.

8. The method as claimed in claim 1, wherein the classifying of the event further includes:
   classifying the event as the low critical event based on a determination that the user does not have presence in the IoT environment; and
   classifying the event as the medium critical event based on a determination that the proximity condition is satisfied.

9. An electronic device for handling critical events in an internet of things (IoT) environment, the electronic device comprising:
   a memory and a processor, wherein the processor is configured to:
   detect an occurrence of an event by using at least one ultra wide band (UWB) sensor present in the IoT environment;
   validate the occurrence of the event by using at least one IoT device among a plurality of IoT devices located in a vicinity of the event;
   determine a criticality level of the event based on at least one of a presence of a user in the IoT environment or a device data of the at least one IoT device located in the vicinity of the event, wherein to determine the critical level of the event, the processor is further configured to:
   determine a location of the user when the event occurred; and
   classify the event as one of a low critical event, a medium critical event, or a high critical event based on whether the location of the user when the event occurred satisfies a proximity condition; and
   generate a recommendation that recommends an action for at least one of the user or the at least one IoT device from the plurality of IoT devices based on the criticality level of the event,
   wherein the proximity condition is satisfied when the location of the user when the event occurred is within a predefined range of distance from the event,
   wherein the processor is further configured to classify the event as the high critical event based on a determination that the proximity condition is not satisfied.

10. The electronic device as claimed in claim 9, wherein the processor is further configured to trigger the at least one IoT device to perform the recommended action.

11. The electronic device as claimed in claim 9, wherein the recommendation that recommends the action for the user recommends an action that avoids health hazards to the at least one of the user due to the event.

12. The electronic device as claimed in claim 9, wherein the device data of the at least one IoT device comprises a location of the at least one IoT device relative a location of the event and a type of the at least one IoT device.

13. The electronic device as claimed in claim 9, wherein the processor is further configured to detect the occurrence of the event by:
   scanning the IoT environment using the at least one UWB sensor;
   obtaining measurements of the IoT environment from the at least one UWB sensor, wherein the measurements comprises at least one of a location or a shape of at least one object in the IoT environment;
   comparing, by electronic device, the obtained measurements of the IoT environment with pre-stored measurements of the IoT environment;
   determining, by the electronic device, a change in the measurements based on the comparison; and
   detecting the occurrence of the event in response to determining the change in the measurements.

14. The electronic device as claimed in claim 13, wherein the processor is further configured to validate the occurrence of the event by:
   obtaining measurements for the occurrence of the event from at least one IoT device among the plurality of IoT devices;
   determining whether the measurements for the occurrence of the event obtained from the at least one IoT device match with the measurements obtained from at least one UWB sensors; and
   validating the occurrence of the event in response to determining that the measurements for the event obtained from the at least one IoT device match with the measurements of the IoT environment obtained from at least one UWB sensor.

15. The electronic device as claimed in claim 9, wherein the processor is further configured to determine the criticality level of the event by:

determining, by the electronic device, an event type corresponding to potential adverse effect or health hazards on the user due to the occurrence of the event;

classifying, by electronic device, the event as the low critical event based on a determination the event type corresponds to potential low adverse effect or health hazards on the user due to the occurrence of the event; or classifying the event as the high critical event based on a determination the event type corresponds to potential high adverse effect or health hazards on the user due to the occurrence of the event.

16. The electronic device as claimed in claim 9, wherein the processor is further configured to:

classify the event as the low critical event based on a determination that the user does not have presence in the IoT environment; and classify the event as the medium critical event based on a determination that the proximity condition is satisfied.

\* \* \* \* \*